(12) United States Patent
Bellur (10) Patent No.: US 10,904,358 B2
(45) Date of Patent: Jan. 26, 2021

(54) QUALITY OF SERVICE IN A DISTRIBUTED SYSTEM

(71) Applicant: Red Hat Inc., Raleigh, NC (US)

(72) Inventor: Vijay Kamalanath Bellur, Bangalore (IN)

(73) Assignee: Red Hat, Inc., Raleigh, NC (US)

( * ) Notice: Subject to any disclaimer, the term of this patent is extended or adjusted under 35 U.S.C. 154(b) by 260 days.

(21) Appl. No.: 15/056,973

(22) Filed: Feb. 29, 2016

(65) Prior Publication Data

US 2017/0251076 A1 Aug. 31, 2017

(51) Int. Cl.
*H04L 12/26* (2006.01)
*H04L 12/24* (2006.01)
*H04L 12/927* (2013.01)
*H04L 29/08* (2006.01)
*H04L 29/06* (2006.01)

(52) U.S. Cl.
CPC ...... *H04L 67/322* (2013.01); *H04L 29/06523* (2013.01); *H04L 41/5003* (2013.01); *H04L 41/5067* (2013.01); *H04L 43/0852* (2013.01); *H04L 43/16* (2013.01); *H04L 47/805* (2013.01); *H04L 65/80* (2013.01); *H04L 67/1097* (2013.01)

(58) Field of Classification Search
CPC .............. H04L 67/322; H04L 67/1097; H04L 43/0852; H04L 43/16; H04L 43/805; H04L 41/5067; H04L 65/80; H04L 29/06523; H04L 47/805
USPC ......................................................... 709/228
See application file for complete search history.

(56) References Cited

U.S. PATENT DOCUMENTS 8,375,223 B2 2/2013 DeHaan et al.
8,650,359 B2 2/2014 Vaghani et al.
8,769,174 B2 7/2014 Sokolinski et al.
(Continued)

OTHER PUBLICATIONS

Thompson et al., "Certificate-Based Access Control for Widely Distributed Resources", https://www.usenix.org/legacy/events/sec99/full_papers/thompson/thompson.pdf, Aug. 23-26, 1999; Information and Computing Sciences Division Ernest Orlando Lawrence Berkeley National Laboratory, 14 pages.
(Continued)

*Primary Examiner* — Emmanuel L Moise
*Assistant Examiner* — Xiang Yu
(74) *Attorney, Agent, or Firm* — Lowenstein Sandler LLP (57) ABSTRACT

A method is provided that includes receiving a tenant identifier. The method also includes identifying a quality of service (QoS) policy associated with a tenant identified by the tenant identifier, by looking up the tenant identifier in a memory data structure. The QoS policy includes a threshold value of a performance parameter. The threshold value is a minimum or a maximum threshold value. The method also includes receiving a service request from the tenant. The method also includes determining an estimated value of the performance parameter in view of the request. The method also includes, responsive to successfully evaluating a validity condition with respect to the estimated value in view of the threshold value, forwarding the request to a servicing component for execution. The validity condition is provided by the estimated value not exceeding the maximum threshold value or the estimated value not falling below the minimum threshold value.

20 Claims, 6 Drawing Sheets

(56) References Cited

U.S. PATENT DOCUMENTS

| | | | |
|---|---|---|---|
| 8,792,491 B2 | 7/2014 | Jackowski et al. | |
| 8,959,312 B2 | 2/2015 | Acharya et al. | |
| 2002/0169657 A1* | 11/2002 | Singh | G06Q 10/06 |
| | | | 705/7.31 |
| 2004/0107281 A1* | 6/2004 | Bose | H04L 29/06 |
| | | | 709/226 |
| 2007/0198679 A1* | 8/2007 | Duyanovich | G06F 11/3452 |
| | | | 709/223 |
| 2009/0157870 A1* | 6/2009 | Nakadai | G06F 9/505 |
| | | | 709/224 |
| 2012/0110055 A1* | 5/2012 | Van Biljon | G06Q 30/04 |
| | | | 709/201 |
| 2013/0155961 A1* | 6/2013 | Brunnenmeyer | H04B 7/18584 |
| | | | 370/329 |
| 2013/0159068 A1* | 6/2013 | Chang | G06Q 10/06313 |
| | | | 705/7.41 |

OTHER PUBLICATIONS

"Harness Specific Targeted Research Project Hardware- and Network-Enhanced Software Systems for Cloud Computing", http://www.harness-project.eu/wp-content/uploads/2014/02/Harness-D5.1.pdf, Oct. 30, 2013, 30 pages.

Vani, et al.; "Cloud-Based Multimedia Storage System with QoS Provision", http://people.ischool.berkeley.edu/~chuang/pubs/inet99.pdf, 2014, Department of Information Technology Marathwada Mitra Mandal's Institute of Technology, Lohgoan, Pune—411043, India, 4 pages.

Chuang, et al; "Distributed Network Storage Service with Quality-of-Service Guarantees", http://www.ijircce.com/upload/2014/november/38C_QoS.pdf, Jun. 1999, Carnegie Mellon University/University of California, Berkeley, 26 pages.

Padwal, et al.; "QoS Provision in a Cloud-Based Multimedia Storage System", http://www.ijircce.com/upload/2014/november/38C_QoS.pdf, Nov. 2014, M.E. (C.E.), G.H.Raisoni College of Engineering & Management, Wagholi, Pune, India; Assistant Professor, H.Raisoni College of Engineering & Management, Wagholi, Pune, India, 5 pages.

* cited by examiner

| | 402 | | 404 | | 406 | | 408 |
|---|---|---|---|---|---|---|---|

| Identify | Read/Write | Size | Serviced Time |
|---|---|---|---|
| Foo | R | 1024 | T0 |
| Foo | W | 4096 | T1 |
| Baz | R | 8192 | T2 |

QUALITY OF SERVICE IN A DISTRIBUTED SYSTEM

TECHNICAL FIELD

The present disclosure is generally related to distributed computer systems, and is more specifically related to systems and methods for managing quality of service in a distributed system.

BACKGROUND

A distributed storage system may be provided by a network attached storage (NAS) system comprising one or more server computer systems each coupled to one or more persistent data storage devices, such as magnetic or optical storage disks, solid-state drives (SSDs), etc.

BRIEF DESCRIPTION OF THE DRAWINGS

The disclosure will be understood more fully from the detailed description given below and from the accompanying drawings of various examples of the disclosure. The drawings, however, should not be taken to limit the disclosure to the specific examples, but are for explanation and understanding only.

The present disclosure is illustrated by way of examples, and not by way of limitation, and may be more fully understood with references to the following detailed description when considered in connection with the figures, in which.

DETAILED DESCRIPTION

Described herein are systems and methods for managing and enforcing a quality of service (QoS) policy for a tenant of a multi-tenant deployment of a distributed system such as a distributed storage system. The QoS policies are applied by mapping identifying information relating to the tenant to the corresponding QoS policy. The identifying information may be based on a component of an authentication credential or other authentication means, such as a security certificate, corresponding to that tenant. The systems described herein support management of various distributed system-related parameters on a per-tenant basis within the distributed system. The distributed system may include a specialized or general purpose scale-out distributed file system. The distributed system may include aggregated storage or processing locations over a network interconnect to provide a single unified file namespace. The distributed system may be implemented in the user space (i.e., by unprivileged code). Alternatively, some or all components of the distributed system may be implemented in the kernel space (i.e., by privileged code).

Examples of the distributed system may include a unified access point in which all tenant/client connections are routed through a single network access point. In other examples, the tenant/client may connect directly to one more components of the distributed system without having to connect through a central access point.

In some examples, the distributed system may include servers to manage metadata or other information associated with the system. In one example, the distributed system may include physical machines, virtual machines, containers, or other resources. The distributed system may implement various storage or processing strategies. For example, the distributed system may distribute a storage volume across multiple storage locations. Redundancy and distributed redundancy may also be incorporated.

The distributed system may include translators, or shared libraries which perform certain functions within the distributed system. The translators may be organized into an array or dynamic list (stacked). The translators may provide deployment specific operation (in which the translators may operate with a specific system such as server formats, programming languages, etc.) or deployment agnostic operation (in which the translators may operate with a wide range of different systems) from either client or server stacks. Additional functionality of the translators is described in more detail below. In some examples, the distributed system manages unstructured data, provides archiving functionality, disaster recovery, virtual machine image storage, cloud storage, content cloud storage, big data storage, structured storage, and semi-structured storage. Other functions available from the distributed system may include data processing, infrastructure, applications, containers, etc.

As the utility and features of distributed systems, as described above, have increased, the number of tenants and the usage totals for these systems have also grown. However, a large number of active tenants and heavier system demands may be a challenge for a distributed system to manage. For example, one such problem that affects distributed systems is known as "Noisy Neighbor." In this situation, a tenant (or application or instance operated by one or more tenants) may consume a disproportionately large amount of resources within the distributed system. This can affect the performance of the system as a whole and the individual experiences of other tenants within the distributed system. In order to address the issue of balancing and fairness, an administrator or management system may enforce a quality of service (QoS) policy laid out in a service level agreement (SLA). However, enforcement of a QoS policy may be particularly difficult in certain distributed system types or structures. For example, some systems may allow clients to communicate directly with one or more data servers within the distributed system without having to go through a gateway or central monitor. In this situation and others, enforcement of a particular QoS may be difficult if not unrealistic.

When establishing a relationship with a distributed system in order to take advantage of one or more services offered by the distributed system, a tenant may agree to a SLA with an external service provider or directly with the distributed system. In some examples, the SLA may affect a tenant experience with regards to access to and use of the distributed system. The SLA may include any number of policies. One or more of those policies may include a quality of service (QoS) policy. In some examples, the QoS policy may be included in the SLA while other examples may provide the QoS policy separate from other agreements or policies. The QoS policy may define one or more parameters of the performance of the distributed system. For example, the QoS may specify a particular threshold of latency, throughput, micro-operations (such as input/output operations per second (iops)), cycles or other performance metrics relating to the distributed system. In some examples, the QoS may be specific to that particular tenant or client or may be applied to a class or group of tenants (for example, tenants subscribing, qualifying, or stipulating to a high-priority QoS).

After agreeing to the SLA with the service provider, the service provider may store the specific SLA for the tenant and provide the SLA to the distributed system. The SLA may include an identifier corresponding to the tenant. The SLA may also include a QoS for the tenant with regards to the distributed system. Responsive to receiving the QoS for the tenant from the service provider, the distributed system may generate a memory data structure in which to store the identifier for the tenant and store the QoS so as to correspond to the identifier corresponding to the tenant. The memory data structure may include a table, list, array, or other data structure. The data structure may be maintained at a central location or distributed to one or more servers or other assets within the distributed system. The distributed system may map specific requests received from the tenant to the identifier and the QoS. For example, the distributed system may receive a request from the tenant to mount a volume. In order to submit the request, the tenant may authenticate its identity by providing an authentication credential. The distributed system may derive the tenant identifier from the authentication credential, perform a lookup on the data structure, and update the data structure with the request if the identifier exists within the data structure. If the identifier is not found within the data structure, the distributed system may create a new entry within the data structure based on the identifier and store the request so as to correspond to the identifier. Examples of the request may include mounting a volume or component, a read or write request, a processor cycle request, or other request.

With distributed systems that allow direct access to their respective components, the data structure containing the identifier, QoS information, and requests may be maintained at a central location within the distributed system or distributed out to each server or other component of the distributed system. In response to a tenant request for access to a component of the distributed system, the tenant establishes its identity by providing an authenticating credential. The identity of the tenant may be proven by presentation of a digital certificate or other instrument (authenticating, cryptographic, etc.). The authentication credential may include a transport layer security (TLS) certificate (previously known as: a secure sockets layer (SSL) certificate), or other certificate or cryptographically protected electronic document.

Once the tenant has presented the authenticating document, the distributed system may derive the identifier, such as a signature, serial number, or other identifying information, and store the derived identifier with the corresponding QoS policy. As described above, this information may be stored within a table, list, or other data structure in memory. The data structure may be created by the distributed system prior to receiving the information for the tenant or may be generated by the distributed system in response to receipt of the tenant information. The distributed system may store an association between the identity of the tenant and the QoS policy to a data structure located at a central location or to one or more components of the distributed system.

Each QoS policy may be associated with one or more tenants. For example, the distributed system may store identifiers, QoS policies, and requests for tenants who have stipulated to a "high-priority" QoS to a location within the data structure designated as high priority. For example:
volume set<VOLUME>QoS.high-priority<tenant_1, tenant_2, tenant_3 . . . tenant_n>

In the above example, requests by tenants 1, 2, 3, and n, are afforded the high priority by the QoS. Similarly, identifiers, QoS policies, and requests for tenants for low-priority tenants may be stored to the data structure with a corresponding indicator of priority. Other granularities may be used for a more varied range of priorities, such as a grade scale (A, B, C, etc.). In some examples, the data structure may correspond to a specific storage volume or other asset or component of the distributed system or to a type of component within the distributed system (memory, processor, etc.).

The QoS policy stored to the data structure may include variables defining parameters such as micro-operations, throughput, latency, etc. One or more locations or buckets within the data structure may be used to store values defining acceptable thresholds for these parameters. For example, a threshold for micro-operations within the data structure may be set by:
volume set<VOLUME>QoS.<bucket>.max_micro-operations 100

In this example, tenant identifiers (1, 2, and 3) are designated to a certain bucket (such as high-priority, low-priority, etc.) according to their corresponding QoS policy parameter for micro-operations per second (iops).

The value defining a number of iops may be a maximum or minimum number of input/output operations per second. Throughput may be expressed in terms of megabits per second or gigabits per second (MBPS/GBPS) while latency may be measured in units of time (seconds, milliseconds, etc.). These and other parameters may be measured by other units.

In some examples, the distributed system may hold one or more of the parameters below a maximum threshold value in order to conserve resources and prevent issues such as "Noisy Neighbor" and the like. If the distributed system determines that execution of a particular request may cause the parameters to exceed the corresponding thresholds, the distributed system may prevent or delay that request. In other examples, the threshold may define a minimum value for the corresponding parameter (e.g. iops). The distributed system may extrapolate an estimated value of an impact of the request. If the request is estimated to meet a validity condition (the estimated value for the parameter is not above a maximum or below a minimum threshold) relative to the corresponding threshold value, the distributed system may service the request. Alternatively, the distributed system may determine that the estimated value of the request meets an invalidity condition in which the threshold value is exceeded by the estimated value. In this case, the distributed system may delay, disregard, reject, or otherwise fail to forward the request for servicing.

In some examples, the distributed system may address an issue with one or more parameters of the system, for example, an iops parameter that has dropped below a minimum threshold by increasing the resources, such as memory, processor cycles, bandwidth, etc., made available in order to increase the parameter to be above the established minimum threshold. This may be accomplished by querying other resources that may be available on the host server or at other locations within the distributed system. In further examples, the QoS may establish a threshold which may define an acceptable window with one or both of a minimum and a maximum for regulating the corresponding parameter. In other examples, the distributed system may prevent the parameters from exceeding the limit by rejecting, dismissing, or delaying requests which would negatively impact the parameters of the distributed system.

One example of enforcing a QoS threshold value or limit on a parameter includes implementing a QoS translator. Generally, as described herein, a translator is a library which is configured to perform one or more functions within the distributed system. As used herein, one or more translators of the distributed system may receive a request from a tenant or overlying translator, analyze the request, reject/discard/modify/pass the request to the next level translator or servicing component. In some examples, the QoS translator may reject the request by returning an error message. The QoS translator may also discard the request in which no return message or communication is made and the request is not forwarded for service. The request may also be modified to move the request to another queue or delayed to be sampled by a later thread. The QoS translator may also pass the request along for service.

In some examples, the QoS translator may reside on a central memory or be resident on one or more components of the distributed system. In some examples, the QoS translator uses the identity of the tenant in combination with other attributes of the distributed system (such as I/O buffer size, request completion time, etc.) to maintain the data structure referenced above. The data structure may include a table, list, array etc. containing values for the identifier corresponding to the tenant, the nature of the operation requested (read, write, etc.), the amount of resources required, and a time log for the request.

In response to receiving a request from a tenant, the QoS translator may check the QoS policy associated with an identifier of the tenant to verify whether or not performing the request, or performing the request in the current queue order, would push parameters of the distributed system outside of an acceptable threshold (which may be a single value or range of values) as defined by the QoS policy in place for that tenant and other tenants of the distributed system. If the QoS translator calculates a projected impact (based on historical or preset metrics) of the request to cause a parameter of the distributed system to stay within the corresponding threshold, the request is passed and the action (read, write, execute, etc.) is performed. In some examples, once the request is passed and fulfilled, the QoS translator may capture details relating to a response to the fulfilled request to update the table with the details, such as the identifier of the request, the amount of resources actually consumed, size of the request, or other information relating to fulfillment of the request. This historical information may be used to consider subsequent requests.

In some examples, the QoS translator may compare an incoming request with this historical data (tenant identifier, request type, size, etc.) to extrapolate an impact of the incoming request. The extrapolation is described in greater detail below.

In another example, if the system determines that performance of the request would result in a parameter crossing the thresholds set by the QoS policy, the QoS translator may push the request down in the queue to be sampled by a later thread or disallow the request. This process may be applied to a high-priority, a low-priority queue, or any other queue.

The QoS translator may operate in a standalone mode in which it may not query other servers or components in the distributed system to determine availability of storage or other resources on other components. The QoS translator may also operate in a distributed mode in which the translator may query other components of the distributed system to determine availability of resources for the tenant at those components. For example, if execution of the request by the current server would exceed the threshold set by the QoS for the tenant, the QoS translator may query another server as to whether or not the request may be performed by the other server without violating the QoS policy. In some examples, the QoS translator may only consider servers of the same type or belonging to the same group as the current server or otherwise qualified to service the request. In the distributed mode, the query from the QoS translator may be limited to a group of servers that provide a connection to a volume associated with the tenant or other component on which the tenant operates.

As described above, the systems described herein provide methods for managing QoS considerations on a per-tenant basis by using information from the authentication document or other authentication means. This facilitates tenant-specific QoS enforcement within a multi-tenant distributed system.

Although aspects of the present disclosure may be particularly useful with certain types of network devices/services, the techniques disclosed herein may be used with other types of devices (both physical and virtual), network services, or other resources that a virtual machine may access.

Figure 1:
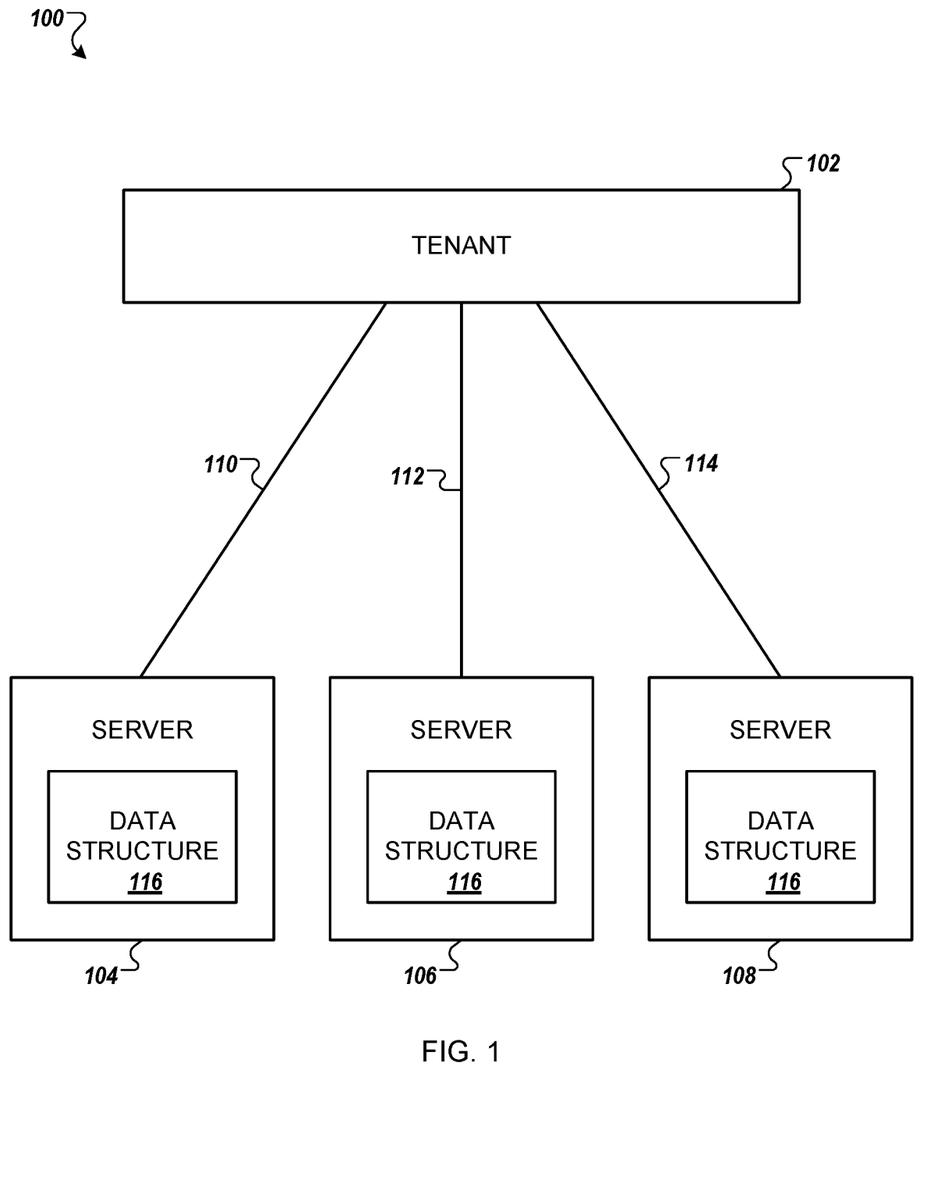
FIG. 1 depicts a block diagram of an example of a tenant-server system in accordance with one or more aspects of the present disclosure.

FIG. 1 depicts a block diagram of an example of a tenant-server system 100 in accordance with one or more aspects of the present disclosure. The tenant 102 may include a client device or other system, application, process, or executable code module. The tenant 102 may connect to one or more servers 104, 106, or 108. The servers 104, 106, and 108 may constitute all or part of a collection of servers within the distributed system. The servers 104, 106, and 108 may include physical devices as well as virtual devices.

The tenant 102 may connect to the servers 104, 106, and 108 via a connection 110, 112, and 114. In some examples, the connection may be a secured connection (such as a secure socket layer (SSL) connection) or an unsecured connection. The connections 110, 112, and 114 may connect the tenant 102 to the servers 104, 106, and 108 over a private network (e.g., a local area network (LAN), a wide area network (WAN), intranet, etc.) or a public network (e.g., the Internet). In the illustrated example, each server 104, 106, and 108 includes a copy of a data structure 116. The data structure 116 may include a table, list, array, matrix, or other structure. In one example, as part of the process for establishing a secure connection 110 between the tenant 102 and the server 104, the tenant 102 may exchange an authenticating means such as a document or digital certificate to prove an identity of the tenant 102. The authenticating means may include a certificate such as a transport layer security (TLS) certificate. Other certificates or authentication documents may be used.

In one example, upon receiving an authentication credential from the tenant 102, the server 104 may derive an identifier from the authentication credential. The identifier may be a signature, serial number, or other component of the authentication credential. The server 104 may store the identifier to a data structure 116. Additionally, the tenant 102 may provide or agree to a quality of service (QoS) policy defining a threshold for a performance parameter of the server 104. The performance parameter may be a latency experienced by the tenant 102 during interaction with the server 104, a throughput, a number of micro-operations (input/output operations per second (iops)), or other parameter(s) corresponding to a distributed system such as processor cycles, bandwidth, etc. The server may store the threshold for the performance parameter of the QoS policy with the appropriate tenant by associating the performance parameter with the corresponding identifier within the data structure 116.

In response to receiving a request from the tenant 102, the server 104 may derive an identifier from the request and lookup the identifier in the data structure 116. If the request would result in the server 104 exceeding the associated parameter set by the QoS policy, the request may be delayed or denied. If the request does not exceed the associated parameter, the server 104 may pass the request to be processed. In some examples, the server 104 may not query other servers to analyze the request. In another example, the server 104 may query other servers 106 and 108 to find additional resources to service the request. In some examples, the return response provided after servicing the request may be stored to the data structure 116 for use in validating a future request. The server may update the data structure 116 with the details of the response to indicate the type of action performed, a time associated with servicing the request (time of receipt, time of fulfillment, time to fulfill, etc.), or other information relating to the response. Updated information stored to the data structure 116 may facilitate more accurate analysis by the server 104 in determining whether or not to pass a subsequent request.

In some examples, each copy of the data structure 116 may be maintained and updated by the corresponding server 104, 106, and 108. In other examples, the data structure 116 may be maintained at a central location in memory to which the servers 104, 106, and 108 have access. In another example, a copy of the data structure 116 may be maintained at the central location and copies of the data structure 116 distributed out to the servers 104, 106, and 108 in response to a change or update to the data structure 116 or based on an update schedule.

In some examples, the tenant 102 may stipulate to a service level agreement (SLA) with a service provider. The service provider may provide the SLA to the server 104. The server 104 may identify a QoS policy from the SLA as well as derive an identifier for the tenant from a certificate provided by the service provider. The server 104 may also receive the QoS and identifier information from other sources. For example, the server 104 may receive the information from another server 106 or 108 through a share or update of the data structure 116. Alternatively, a central management system may provide the information to the individual servers 104, 106, and 108.

Figure 2:
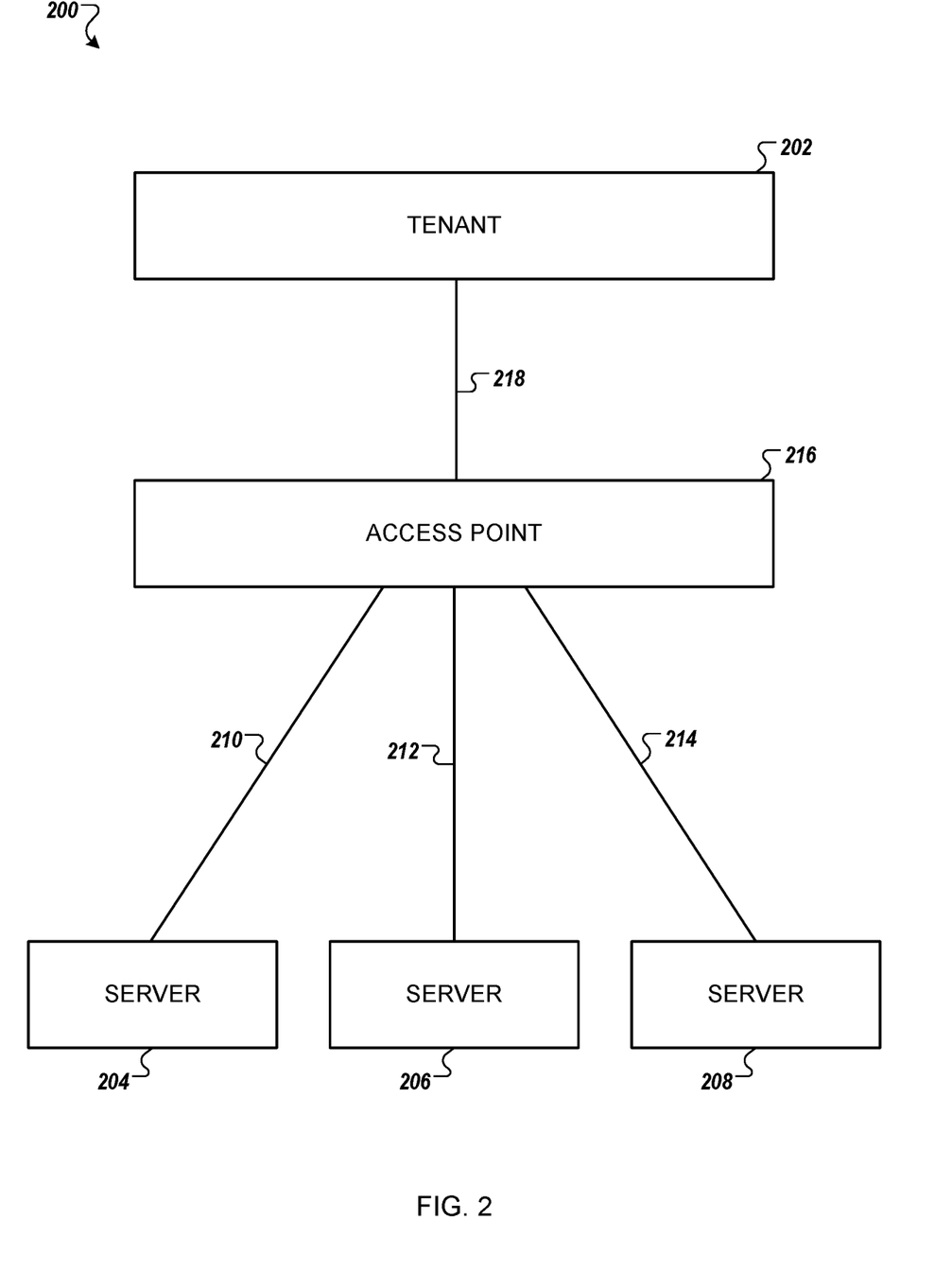
FIG. 2 depicts a block diagram of an example of a tenant-server system with an intermediate unified access point in accordance with one or more aspects of the present disclosure.

FIG. 2 depicts a block diagram of an example of a tenant-server system 200 with an intermediate access point 216 in accordance with one or more aspects of the present disclosure. In the illustrated example, the tenant 202 communicates with the servers 204, 206, and 208 by way of the access point 216. In one example, the access point 216 is one of a plurality of access points for a distributed system. In another example, the access point 216 may be a unified access point 216 to format, route, screen, etc. all requests for the distributed system. In some examples, the access point 216 may derive the identifier and QoS information for the servers 204, 206, and 208 and distribute the information accordingly. In some examples, the access point 216 may facilitate an initial communication to register or authenticate the tenant 202 and then allow the tenant 202 to communicate directly with the servers 204, 206, and 208. The access point 216 may include management functionality to select a server 204 with a volume to mount for the tenant 202.

In some examples, the access point 216 may facilitate establishment of a QoS policy for the tenant 202. In other examples, a service provider may establish the QoS and communicate the QoS and corresponding information (such as an identifier) to the server 204 via the access point 216. A service provider may configure the QoS and communicate the corresponding information to the servers 204, 206, and 208 via the access point 216 or directly to the servers 204, 206, and 208. Other arrangements and configurations may be implemented.

Figure 3:
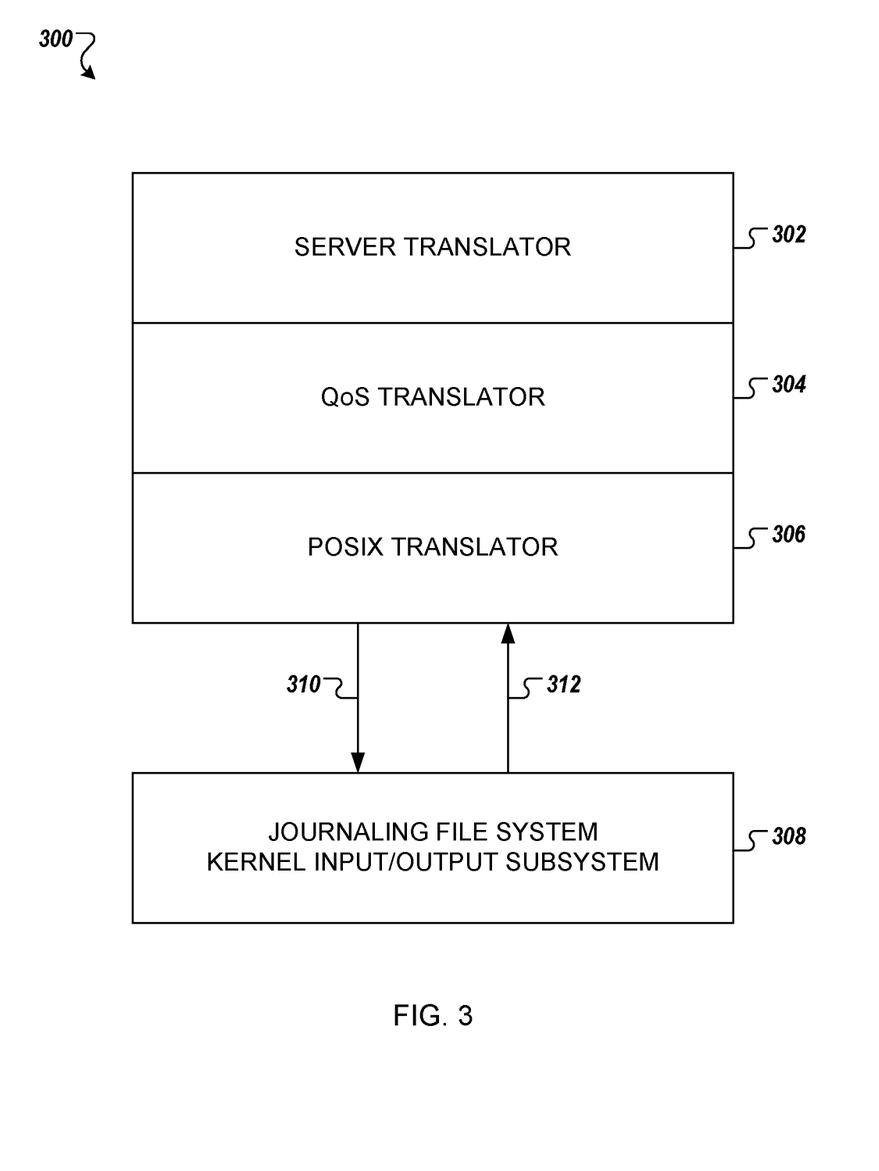
FIG. 3 depicts a block diagram of an example of a translator stack in accordance with one or more aspects of the present disclosure.

FIG. 3 depicts a block diagram of an example of a translator stack 300 in accordance with one or more aspects of the present disclosure. As used herein, a translator stack may include a hierarchical structure of libraries in a linear assembly of routines that may be stored as executable files. The translator stack 300 includes a server translator 302, a QoS translator 304, and a portable operating system interface (POSIX) translator 306. The stack 300 may also communicate with a journaling file system coupled with a kernel I/O subsystem. The translator stack 300 may be located in memory on a server within the distributed storage system or in memory on a central management system. The translator stack 300 manages the QoS for the distributed system as described below.

The server translator 302 may maintain a data structure containing the identifier, QoS thresholds, and request data. In some examples, the server translator 302 may record identifiers to the data structure based on a priority level established by the corresponding QoS policy. In one example, the server translator 302 may store a series of tenant identifiers as corresponding to a high priority QoS. For example, the server translator 302 may configure the QoS policy as follows:

volume set<VOLNAME>QoS.high-priority<identifier1, identifier2, identifier3 . . . >

In this example, tenant identifiers (1, 2, and 3) are designated as high-priority according to their corresponding QoS policies.

The server translator 302 may further identify parameter thresholds based on the QoS policy or a determination made by the QoS translator. This may include the high-priority QoS mentioned above. In one example, a designation of high-priority in a QoS policy may trigger an application of default high-priority parameter thresholds. In another example, each parameter may be individually determined and set based on available resources, current usage metrics, etc. For example, the threshold for a throughput may be set as follows:

volume set<VOLNAME>QoS.<bucket>.max-throughput 100 MBPS

Other parameters and QoS policies may be similarly established and maintained by the server translator based on a received input or a set of rules.

The QoS translator 304 determines if a received request will cause a performance parameter to exceed the set threshold. This determination may be made by considering historical request impact data, standard impact values, or by a dynamic comparison of currently available resources, system traffic, etc. to extrapolate the impact of the received request on the distributed system as a whole, the server with which the tenant is interacting, or a broader range of components within the distributed system. This extrapolation may be linear or non-linear. For example, the extrapolation may estimate the impact on a logarithmic or exponential scale. Additionally, the QoS translator may apply other factors to adjust the extrapolation. If the QoS translator 304 determines that the request will exceed the threshold, the QoS translator 304 may delay the request (by moving the request down within a queue for later sampling or moving to a low-priority queue) or disallow the request entirely. If the QoS translator 304 determines that the request will not exceed the threshold, the request may be allowed.

Other factors involved in the determination of the QoS translator 304 to pass or reject a request may include the size of an I/O buffer, the time of completion of a request, resources required to fulfill the request, etc. This information may be stored in the table or otherwise provided or made accessible to the QoS translator 304. The QoS translator 304 may match this information for a request to match a historical impact or extrapolate an impact of the request on the parameter with respect to a corresponding threshold.

When a stack 300 receives a new request, the QoS translator 304 may look up the identifier for the request to verify the QoS policy and a corresponding threshold. The QoS translator may then project whether or not fulfillment of the request would cause a parameter to exceed the threshold. Additionally, the QoS translator may update the table in the return path of an allowed request with details from the request to provide additional historical data against which subsequent requests may be checked.

In some examples, the QoS translator 304 may operate in a stand-alone mode in which the QoS translator 304 will not query other servers outside of the server on which the QoS translator 304 operates. The QoS translator 304 may also operate in a distributed mode in which the QoS translator 304 may query other servers for the tenant. In some examples, when in the distributed mode, the QoS translator may be restricted to a querying a group of servers such as servers within a trusted storage pool which provide storage or other resources to the volume on which the tenant operates.

The POSIX translator 306 receives allowed requests from the QoS translator 304 and sends back the response to the requests to the QoS translator 304. In some examples, the POSIX translator 306 serves as an interface between the translator stack 300 and the journaling and I/O portion 308 of the process. The POSIX translator 306 may operate as an application program interface (API), a thread interface, a security interface, an I/O interface, etc.

The journaling file system and kernel I/O subsystem may track changes resulting from a request in a journal data structure and perform file caches, I/O operations, system calls, etc. respectively. Other systems/subsystems may interface with the translator stack 300 to provide more or other functionality.

Figure 4:
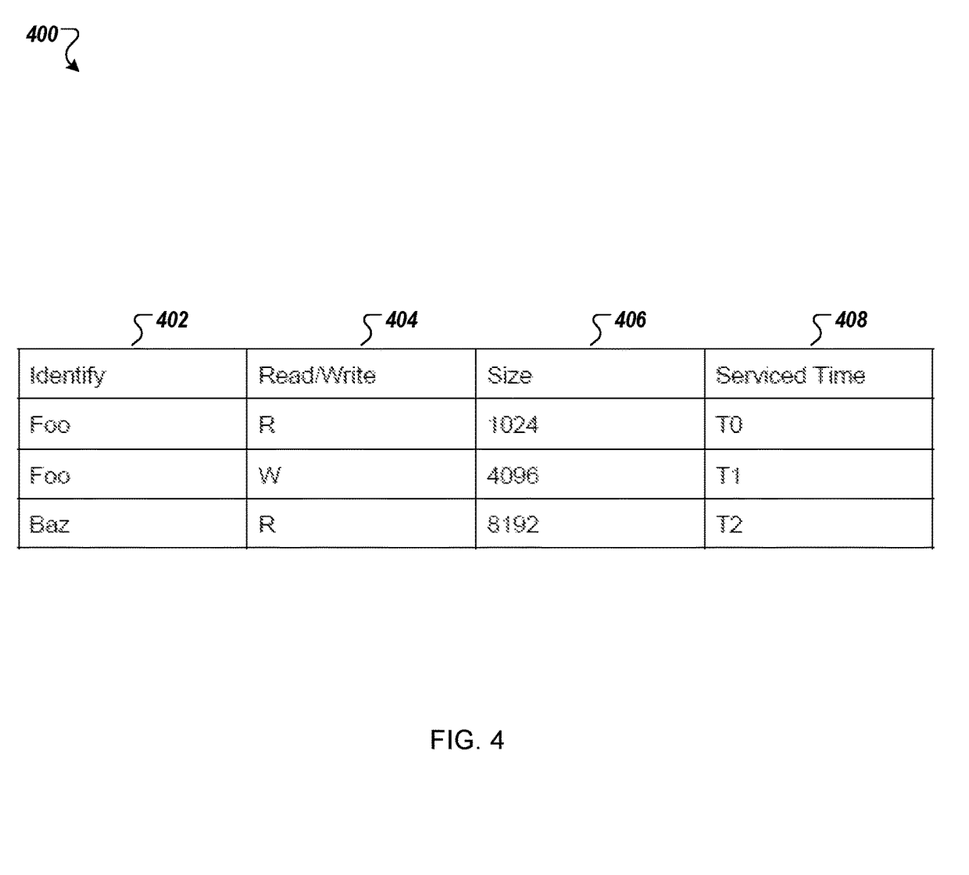
FIG. 4 depicts a diagram of an example of a table for managing identifiers and other information in accordance with one or more aspects of the present disclosure.

FIG. 4 depicts a diagram of an example of a data structure 400 for managing identifiers and other information in accordance with one or more aspects of the present disclosure. The data structure 400 may be identical to the data structures 116 of FIG. 1. In one example, the data structure 400 is a table or other structure generated or maintained in memory by the QoS translator 304 described above. In one example, a request received by the server may be associated with the tenant identifier. The tenant identifier is stored to a first column 402 of the data structure 400. The data structure 400 also includes a description 404 of the request, such as read or write. The QoS translator may also store buffer size information 406 which may define a buffer size needed to process a request. The data structure 400 also includes a time 408 corresponding to the request (such as a time for completion, time elapsed since request, etc.). In some examples, the data structure 400 may further include information relating to the QoS policy, current or past requests, or other information that may be considered for QoS management. The QoS translator may check the data structure 400 in response to receipt of a new request. The QoS translator may use information from the data structure 400 to estimate an impact of the new request on a parameter of the distributed system. The data structure 400 may also be updated by the QoS translator to include information provided in a return path of a request. The data structure 400 may be limited to a certain size. In some examples, the data structure 400 may be updated by the QoS translator to remove old entries after a certain time or to make space for newer entries. In some examples, the QoS translator may truncate the data structure 400 to maintain a specific size in memory.

Figure 5:
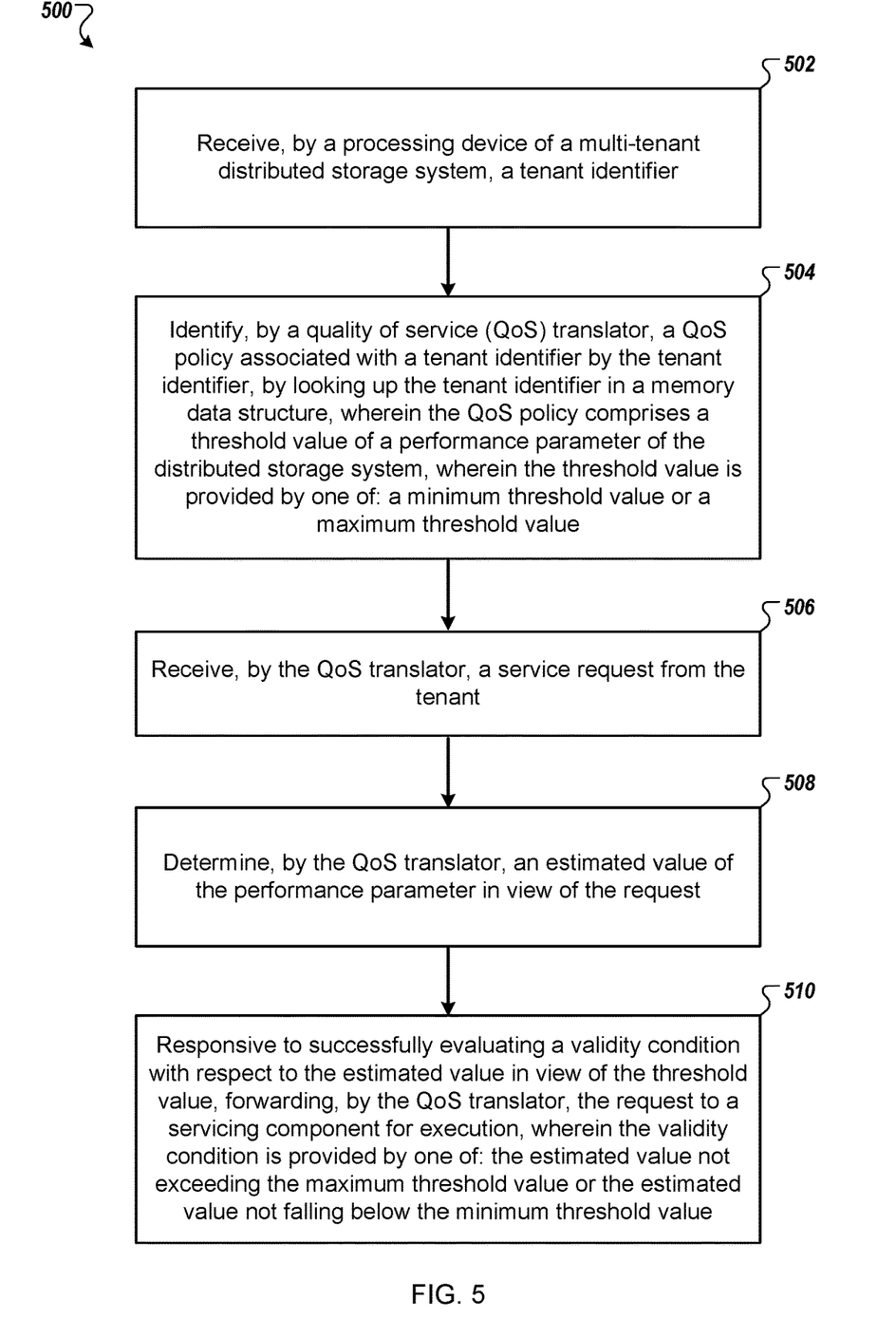
FIG. 5 depicts a flow diagram of a method for managing quality of service for a distributed system in accordance with one or more aspects of the present disclosure.

FIG. 5 depicts a flow diagram of a method 500 for managing quality of service for a distributed system in accordance with one or more aspects of the present disclosure. At block 502, a processing device of a multi-tenant distributed storage system receives a tenant identifier. The identifier may be derived from an authentication document such as a digital certificate which may include a TLS certificate or other authenticating credentials. The processing device may execute a server translator which may be stored at a central management system within the distributed storage system or located on a distributed server. In one example, the tenant identifier may include a signature, serial number, or other component of the authentication document.

At block 504, a quality of service (QoS) translator, may identify a QoS policy associated with a tenant identifier by the tenant identifier, by looking up the tenant identifier in a memory data structure. The QoS policy comprises a threshold value of a performance parameter of the distributed storage system. The threshold value may be provided by one of: a minimum threshold value or a maximum threshold value. The performance parameter may include a threshold for throughput, latency, micro-operations, etc. of the distributed system. The QoS policy may set the threshold uniquely for a particular tenant or commonly across a priority, group, class, or type of tenant.

At block 506, the QoS translator receives a service request from the tenant. At block 508, the QoS translator may determine an estimated value of the performance parameter in view of the request. In some examples, the QoS translator may extrapolate an impact of the request upon the performance parameter based on factors such as the identifier, the operation type, the buffer size, or the service time as stored in the memory data structure to generate the estimated value. In one example, the QoS translator may extrapolate the impact by identifying one or more historical records from previously serviced requests based on similarities, such as matching tenant identifier, request type, similar request size, etc. From this record, the QoS translator may extrapolate an impact by determining a level of similarity, calculating an average impact based on the record or a plurality of similar records. In some examples, the QoS may calculate a multiplier or other factor by which the impact may be extrapolated based on an identified degree of difference between values of the current request and those of the record. For example, the current request may have a value, such as a request size, that is twice that of the corresponding metric of a stored record. In response, the QoS may extrapolate the impact to be twice that in the record. In some examples, the QoS translator may also account for other factors such as current load on the distributed system. Such factors may be applied by way of a multiplier, factor, or other adjustment to the extrapolation. Other considerations may be used to further refine and improve the accuracy of the extrapolation.

In some examples, the historical records are generated by forwarding, by a POSIX translator, a response from the servicing component which includes values including the tenant identifier of the serviced request, the type of the serviced request (read, write, etc.), the time to service the request, a memory or processor metric of the request (amount of memory, number of processor cycles, etc.). These values are forwarded, by the POSIX translator, to the QoS translator which updates the memory data structure to include the values. These values may then be used as described above to extrapolate impact values for subsequent requests.

At block 510, the QoS translator forwards the request to a servicing component responsive to successfully evaluating a validity condition with respect to the estimated value in view of the threshold value. The validity condition is provided by one of: the estimated value not ex ceding the maximum threshold value of the estimated value not falling below the minimum threshold value. In some examples, the QoS translator may evaluate the estimated value to determine if a validity or non-validity condition exists. If the validity condition is successfully evaluated, the QoS translator may forward the request for servicing. If an invalidity condition is successfully evaluated in which the estimated value is below a minimum threshold value or above a maximum value. In some examples, the QoS translator may also receive return path information from the request to update the data structure for analyzing subsequent requests.

Figure 6:
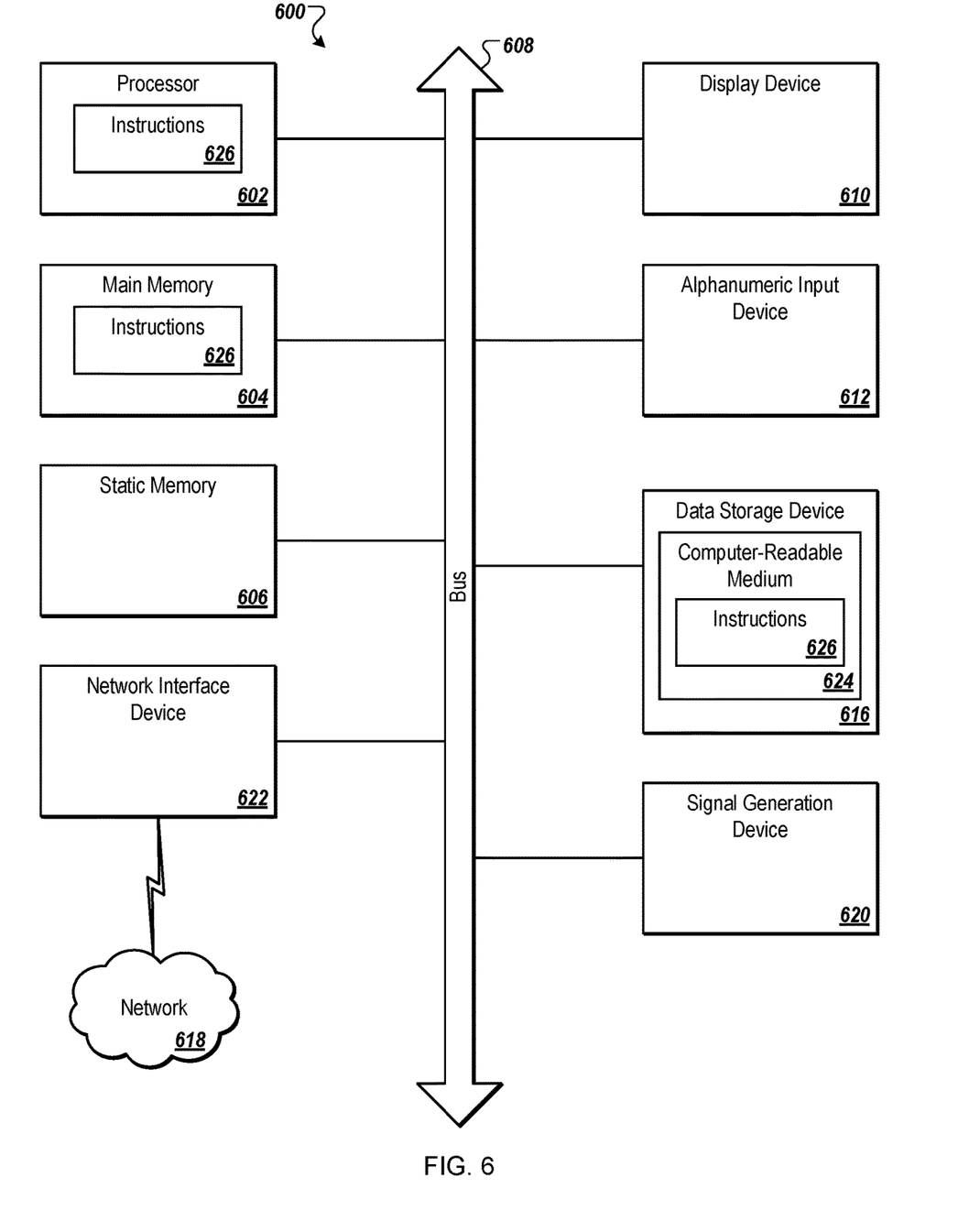
FIG. 6 depicts a block diagram of an example computer system in accordance with one or more aspects of the present disclosure.

FIG. 6 depicts a block diagram of an example computer system in accordance with one or more aspects of the present disclosure. In one example, computer system 600 may correspond to computer system 100 of FIG. 1. The computer system may be connected (e.g., networked) to other computer systems in a LAN, an intranet, an extranet, or the Internet. The computer system 600 may operate in the capacity of a server in a client-server network environment. The computer system 600 may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a drive unit 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions that may include instructions to execute instructions 626 for performing the operations and steps discussed herein. For example, in one example, the instructions 626 may perform any one of the methods of flow diagram 500 of FIG. 5.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The drive unit 616 or secondary memory may include a computer-readable medium 624 on which is stored one or more sets of instructions 626 (e.g., instructions for the instructions) embodying any one or more of the methodologies or functions described herein. Instructions for the instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622. The instructions 626 may further be transmitted or received over a network 625 via the network interface device 622.

The non-transitory computer-readable storage medium 624 may also be used to store the instructions 626 persistently. While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, non-transitory computer-readable storage mediums, solid-state memories, optical media, and magnetic media.

The instructions 626, components and other features described herein can be implemented as discrete hardware components or integrated in the functionality of hardware components such as ASICS, FPGAs, DSPs or similar devices. In addition, the instructions 626 can be implemented as firmware or functional circuitry within hardware devices. Further, the instructions 626 can be implemented in a combination hardware devices and software components. For example, the functionality of this module can exist in a fewer or greater number of modules than what is shown, with such modules residing at one or more computing devices that may be geographically dispersed. The modules may be operable in conjunction with network 625 from which it may receive and provide relevant information regarding managing QoS in a distributed system "Processor" herein refers to a device capable of executing instructions encoding arithmetic, logical, or I/O operations. In one illustrative example, a processor may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

"Memory" herein refers to a volatile or non-volatile memory device, such as RAM, ROM, EEPROM, or any other device capable of storing data.

"I/O device" herein refers to a device capable of providing an interface between a processor and an external device capable of inputting and/or outputting binary data. Although, for simplicity, a single processor may be described herein, in some other examples the system may comprise a plurality of processors. Similarly, in some other examples, the system may comprise a plurality of I/O devices, rather than a single device, and a plurality of memory devices rather than a single memory device.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "allocating", "notifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:

receiving, by a processing device of a multi-tenant distributed storage system, a tenant identifier;

identifying, by a quality of service (QoS) translator executed by the processing device, a QoS policy associated with a tenant identified by the tenant identifier, by referencing the tenant identifier in a memory data structure, wherein the QoS policy comprises a threshold value of a performance parameter of the distributed storage system, wherein the threshold value is provided by one of: a minimum threshold value or a maximum threshold value;

receiving, by the QoS translator, a service request from the tenant;

identifying, in a plurality of historical records from previously-serviced requests, a subset of the plurality historical records to be used to estimate an impact of the service request on the performance parameter of the distributed storage system, wherein the identifying of the subset of historical records is based on a comparison between (i) the tenant identifier of the tenant, a request type of the service request and a request size of the service request and (ii) a tenant identifier, a request type and a request size of respective historical records in the subset;

generating an impact value indicating the impact of the service request on the performance parameter of the distributed storage system, the impact value being determined based on at least one of a level of similarity or a degree of difference between (i) the tenant identifier of the tenant, the request type of the service request and the request size of the service request and (ii) the tenant identifier, the request type and the request size of the respective historical records in the subset;

determining, by the QoS translator in view of the impact value, an estimated value of the performance parameter that is predicted to result from servicing the service request of the tenant; and responsive to successfully evaluating an invalidity condition with respect to the estimated value in view of the threshold value, allocating, by the QoS translator, computing resources of the multi-tenant distributed storage system to execute an operation associated with the service request.

2. The method of claim 1, further comprising responsive to successfully evaluating the invalidity condition with respect to the estimated value in view of the threshold value, performing one of: rejecting the request or discarding the request, wherein the invalidity condition is provided by one of: the estimated value exceeding the maximum threshold value or the estimated value falling below the minimum threshold value.

3. The method of claim 1, wherein receiving the tenant identifier comprises receiving a transport layer security (TLS) certificate.

4. The method of claim 1, wherein the QoS translator operates in one of: a standalone mode or a distributed mode.

5. The method of claim 1, wherein the performance parameter comprises a latency of tenant request servicing by the distributed storage system.

6. The method of claim 1, wherein the performance parameter comprises a rate of tenant request servicing by the distributed storage system.

7. The method of claim 1, wherein the performance parameter comprises a number of input/output operations per second (iops) performed by the distributed storage system.

8. The method of claim 1, further comprising responsive to successfully evaluating the invalidity condition with respect to the estimated value in view of the threshold value, delaying the service request, wherein the invalidity condition is provided by one of: the estimated value exceeding the maximum threshold value or the estimated value falling below the minimum threshold value.

9. A system comprising:
a memory device; and
a processing device of a distributed storage system, the processing device operatively coupled to the memory device, the processing device to:
receive a first request, corresponding to a first tenant, to mount a volume within a distributed storage system;
derive a tenant identifier from an authentication credential, wherein the authentication credential is to authenticate the first request;
identify, in a quality of service policy for the first tenant, a threshold value associated with a performance parameter of the distributed storage system, wherein the threshold value is provided by one of: a minimum threshold value or a maximum threshold value;
identify, in a plurality of historical records from previously-serviced requests, a subset of the plurality historical records to be used to estimate an impact of the first service request on the performance parameter of the distributed storage system, wherein the identifying of the subset of historical records is based on a comparison between (i) the tenant identifier of the first tenant, a request type of the first service request and a request size of the first service request and (ii) a tenant identifier, a request type and a request size of respective historical records in the subset;
generate an impact value indicating the impact of the first service request on the performance parameter of the distributed storage system, the impact value being determined based on at least one of a level of similarity or a degree of difference between (i) the tenant identifier of the first tenant, the request type of the first service request and the request size of the first service request and (ii) the tenant identifier, the request type and the request size of the respective historical records in the subset;
determine, in view of the impact value, an estimated value of the performance parameter in view of a second request initiated by a second tenant; and
responsive to successfully evaluating an invalidity condition with respect to the estimated value in view of the threshold value, allocate computing resources of the distributed storage system to execute an operation associated with the second request.

10. The system of claim 9, wherein the processing device is further to perform, responsive to successfully evaluating an invalidity condition with respect to the estimated value in view of the threshold value, one of: delaying, rejecting, or discarding the first request, wherein the invalidity condition is provided by one of: the estimated value exceeding the maximum threshold value or the estimated value falling below the minimum threshold value.

11. The system of claim 9, wherein the authentication credential comprises a transport layer security (TLS) certificate.

12. The system of claim 9, wherein the processing device is to execute a quality of service (QoS) translator.

13. The system of claim 9, wherein the performance parameter comprises a latency of the distributed storage system.

14. The system of claim 9, wherein the performance parameter comprises a throughput of the distributed storage system.

15. The system of claim 9, wherein the performance parameter comprises a number of input/output operations per second (iops) within the distributed storage system.

16. The system of claim 9, wherein the processing device is further to update a memory data structure with information from a return path of a completed request.

17. The system of claim 9, wherein the processing device is to execute a layered server translator stack.

18. A non-transitory computer readable medium comprising executable instructions that when executed by a processing device, cause the processing device to:
- generate a memory data structure comprising an entry for a tenant of a multi-tenant distributed storage system, the entry comprising an identifier derived from an authentication credential of the tenant, the entry further comprising a threshold value associated with the tenant, wherein the threshold value is provide by one of: a minimum threshold value or a maximum threshold value;
- associate a request with the tenant by matching an identifier associated with the request with the identifier in the entry;
- identify, in a plurality of historical records from previously-serviced requests, a subset of the plurality historical records to be used to estimate an impact of the request on a performance parameter of the distributed storage system, wherein the identifying of the subset of historical records is based on a comparison between (i) the identifier of the tenant, a request type of the request and a request size of the request with a tenant identifier, a request type and (ii) a request size of respective historical records in the subset;
- generate an impact value indicating the impact of the request on the performance parameter of the distributed storage system, the impact value being determined based on at least one of a level of similarity or a degree of difference between (i) the identifier of the tenant, the request type of the request and the request size of the request and (ii) the tenant identifier, the request type and the request size of the respective historical records in the subset;
- determine, in view of the impact value, an estimated value of the performance; and
- responsive to successfully evaluating an invalidity condition with respect to the estimated value in view of the threshold value, allocate computing resources of the multi-tenant distributed storage system to execute an operation associated with the request.

19. The non-transitory computer readable medium of claim 18, wherein the authentication credential comprises a transport layer security (TLS) certificate.

20. The non-transitory computer readable medium of claim 18, wherein the performance parameter comprises one of a latency, a throughput, or a number of input/output operations per second (iops) within the distributed storage system.

* * * * *

UNITED STATES PATENT AND TRADEMARK OFFICE
CERTIFICATE OF CORRECTION

PATENT NO. : 10,904,358 B2
APPLICATION NO. : 15/056973
DATED : January 26, 2021
INVENTOR(S) : Vijay Kamalanath Bellur It is certified that error appears in the above-identified patent and that said Letters Patent is hereby corrected as shown below:

In the Claims

In Claim 18, Column 18, Line 11, after "performance" insert --parameter--

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*